United States Patent

[11] 3,584,534

| [72] | Inventor | Everett D. Hougen<br>G-5072 Corunna Road, Flint, Mich. 48504 |
|---|---|---|
| [21] | Appl. No. | 815,296 |
| [22] | Filed | Apr. 11, 1969 |
| [45] | Patented | June 15, 1971 |

[54] DEVICE FOR DRIVING A HOLE CUTTER
21 Claims, 10 Drawing Figs.

[52] U.S. Cl. .................................................. 90/14,
90/15, 77/61
[51] Int. Cl. .................................................... B23c 3/34,
B23b 41/04
[50] Field of Search ........................................ 90/15.2, 15,
14, 17, 11.3; 143/85, 85-1; 77/61

[56] References Cited
UNITED STATES PATENTS

| 1,316,718 | 9/1919 | Hall | 90/15 X |
| 2,499,842 | 3/1950 | Armitage | 90/15 |
| 2,915,949 | 12/1959 | Novkov | 90/15 |
| 3,351,998 | 11/1967 | Theiler | 143/85 X |
| 3,390,596 | 7/1968 | Trevathan | 143/85 X |

FOREIGN PATENTS

| 857,704 | 4/1940 | France | 90/15 |

*Primary Examiner*—Gil Weidenfeld
*Attorney*—Barnes, Kisselle, Raisch & Choate

ABSTRACT: A drive unit for a hole cutter such as a hole saw having a housing in which a sleeve is journaled for rotation about a fixed axis. A shaft having a hole cutter at one end thereof is journaled in the sleeve for rotation about an axis inclined to the axis of the sleeve. The sleeve and shaft rotate at different speeds in the same or opposite directions so that the hole cutter rotates about its own central axis and simultaneously revolves about the axis of the sleeve at an acute angle.

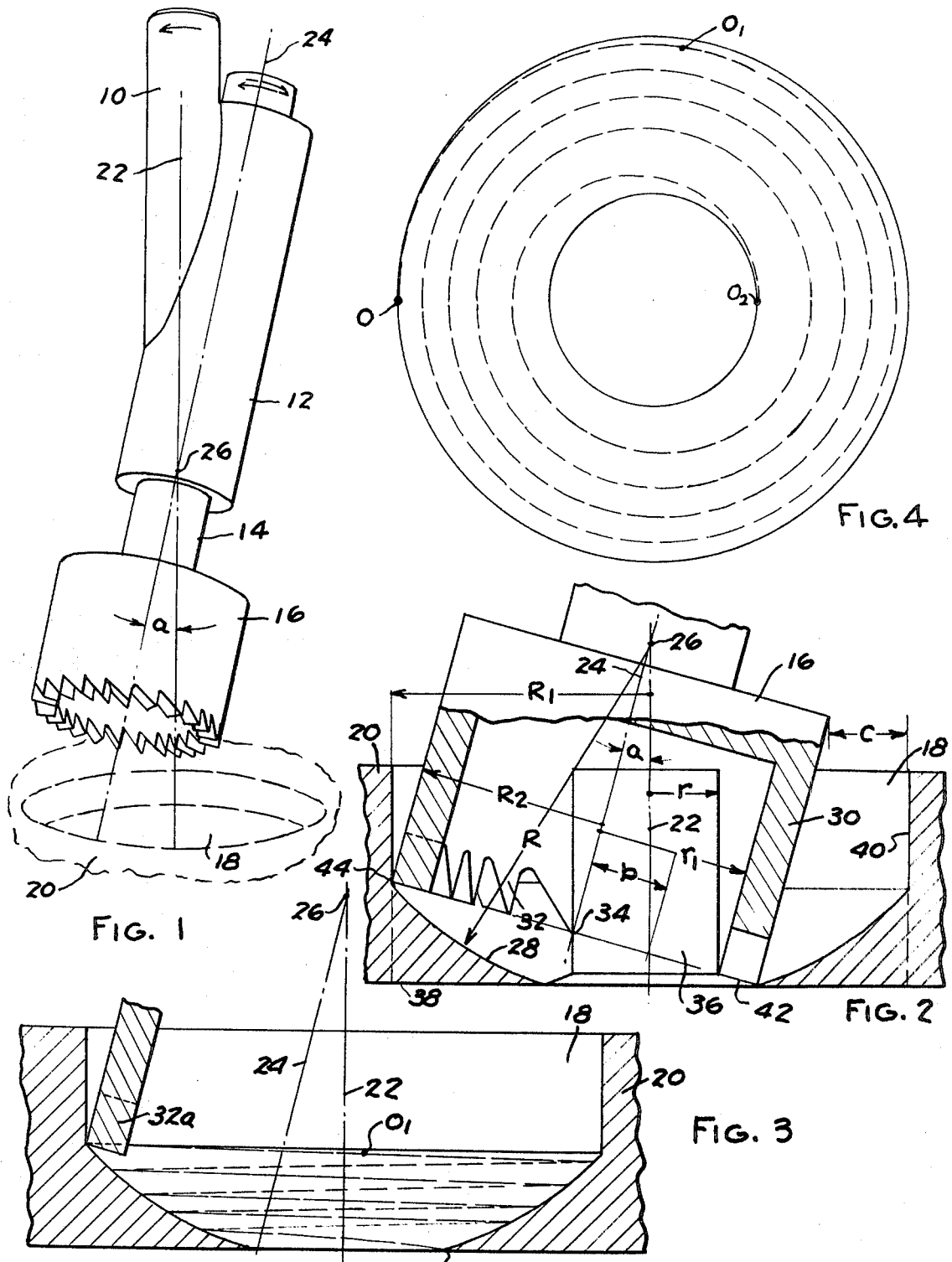

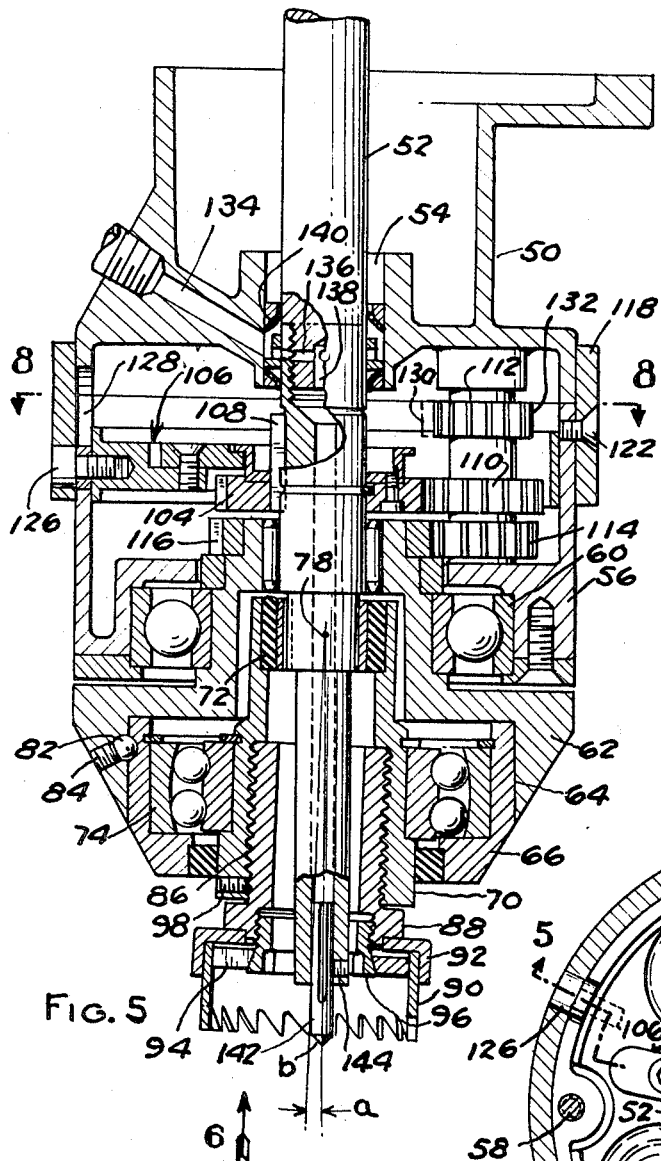

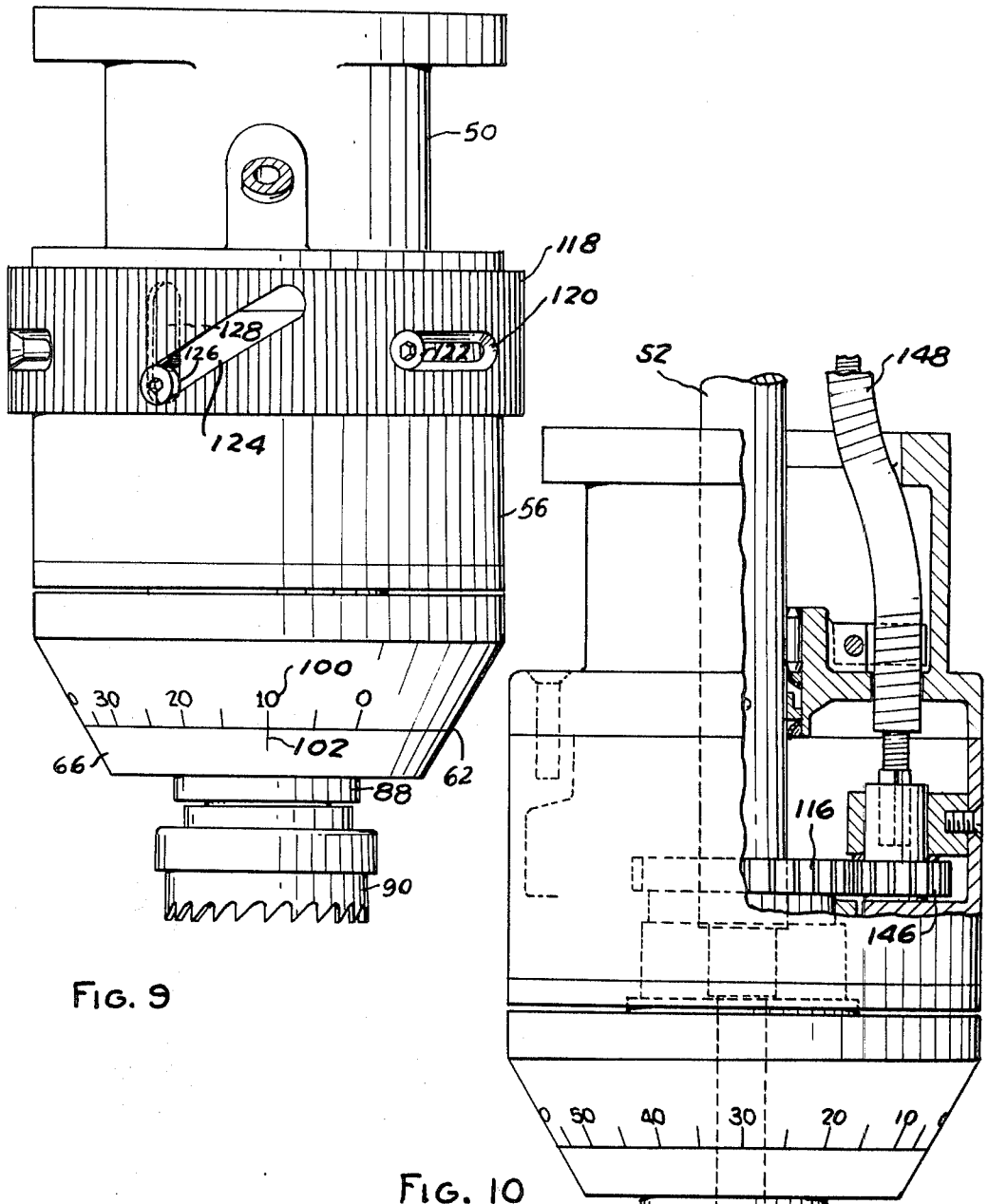

DEVICE FOR DRIVING A HOLE CUTTER

This invention relates to a device for driving a hole cutter. A hole cutter as used herein refers to an annular-type cutter, such as a hole saw, having a cylindrical outer wall or shell provided with cutting teeth at one end of the hollow cylinder which lie in a plane perpendicular to the central axis of the cylinder.

When a hole cutter is driven in a conventional manner (such as by a drill press, a hand-held drill, a milling machine, etc.) the operation of cutting the hole is a slow, difficult and inefficient one. These disadvantages flow primarily from the fact that when a hole cutter is driven in a simple rotary motion into the work all of the teeth on the cutter are required to cut simultaneously until the hole cutting operation is completed. This requires a high power input to the hole cutter both for rotation and for feeding into the work.

The fact that all of the teeth are cutting simultaneously when a hole cutter is driven in a conventional manner also creates a cutter cooling problem. In the case of soft, relatively low melting point materials (such as plastic, rubber, asphalt, asbestos, etc.) the heat buildup results in softening of such materials and as a consequence the teeth of the cutter become clogged and the surface of the hole being cut is virtually destroyed. In the case of hard materials such as steel the heat buildup frequently results in failure of the cutting teeth.

Other problems which have severely limited the use of hole cutters are:
a. the formation of an objectionable burr around the bottom of the hole where the cutter breaks through the workpiece;
b. poor surface finish of the hole being cut;
c. the lack of any means to adjust the diameter of the finished hole;
d. the requirement of having a centering device to properly start the hole cutting operation; and
e. the absence of a workpiece chip removal clearance area between the cutter outside wall and the inside diameter of the hole.

The primary object of this invention is to provide a device for driving a hole cutter in a manner which eliminates or minimizes the problems referred to above which are encountered when a hole cutter is driven in a conventional manner.

More specifically, this invention has for its objects:
a. to improve the life of a hole cutter as it relates to wear on the teeth of the cutter and tooth failure due to overload;
b. to reduce the input power requirements for a hole cutter with respect to both rotation and axial feed;
c. to permit adjustment of the size of the hole being cut without changing the size of the hole cutter;
d. to improve the surface finish of a hole produced by the hole cutter;
e. to cut a hole in a workpiece in which the center slug cut from the workpiece will not bind on the inside of the hole cutter;
f. to drive a hole cutter such as to produce a clearance between the outer sidewall of the cutter and the hole being cut for enabling chips to be discharged readily through said clearance space to the outer surface of the workpiece;
g. to drive the hole cutter in a manner which minimizes heat buildup in the teeth of the cutter and to enable cutting of soft material and prolonging tooth life;
h. to minimize the formation of a burr around the bottom edge of the hole where the cutter breaks through the workpiece;
i. to minimize the tendency for the teeth of a hole cutter to bind on and seize the work, particularly when the cutter breaks through the bottom of the workpiece;
j. to drive a hole cutter so that the slug cut thereby has a diameter sufficiently smaller than the inside diameter of the cutter to facilitate easy discharge of the slug from within the cutter upon completion of the cutting operation; and
k. to drive a hole cutter in such a manner as to avoid the necessity of a centering device on the hole cutter;
l. to drive a hole cutter in such a manner as to be able to vary the length of the chip produced;
m. to drive a hole cutter in such a manner as to release and throw a cut chip upwardly and outwardly toward the top periphery of the hole being cut;
n. to provide a device which will permit the use of a conventional hole saw when cutting materials which are highly susceptible to work hardening; and
o. to provide a device which will permit cutting of elliptical and tapered holes with a conventional hole cutter.

Other features and objects of the present invention will become apparent from the following description and drawings in which:

FIG. 1 is a schematic perspective view of a device for driving a hole cutter in accordance with the present invention.

FIG. 2 is a schematic vertical sectional view of the device shown in relation to a workpiece prior to completion of the hole cutting operation.

FIG. 3 is a schematic side elevational view illustrating the path of travel followed by a single cutting tooth.

FIG. 4 is a schematic plan view showing the path of travel of a single-cutting tooth when the cutter is driven by the device of this invention.

FIG. 5 is a vertical sectional view along the line 5—5 in FIG. 8 of one practical embodiment of the device according to the present invention.

FIG. 6 is a view of the device illustrated in FIG. 5 as viewed in the direction of the arrow 6.

FIG. 7 is a somewhat diagrammatic view illustrating in an exaggerated manner the relationship of various components of the device illustrated in FIG. 5.

FIG. 8 is a sectional view along the line 8—8 in FIG. 5.

FIG. 9 is a side elevational view of the device shown in FIG. 5.

FIG. 10 is a side elevational view, partially in section, of a modified form of device according to the present invention.

In FIG. 1 the device of the present invention is shown somewhat diagrammatically for the purpose of illustration. The device comprises a shaft 10 which is adapted to be connected to a rotating power unit (such as a drill press, a hand-held drill, a milling machine, etc.). Shaft 10 can be considered as having an integral bushing 12 thereon in which there is journaled a shaft 14 having a cutter 16 secured to the lower end thereof. The device is arranged for cutting a hole 18 in a workpiece 20, the center axis of hole 18 coinciding with the axis 22 about which shaft 10 is rotated. Shaft 14 is journaled in bushing 12 so that its axis 24 intersects axis 22 as at 26 at a predetermined angle a. It is intended that shaft 14 be rotated simultaneously with shaft 10 either through a gear or other speed changing device connected to shaft 10 or by a second rotating power source independent from shaft 10 at a speed and in a direction which is related to the cutting action and characteristics desired.

Hole 18 and the manner in which it is formed by the device illustrated in FIG. 1 is shown with greater particularity in FIG. 2. When shafts 10 and 14 are simultaneously rotated cutter 16 rotates about its axis 24 and at the same time the axis 24 generates a cone around the axis 22 so that cutter 16 in effect actually revolves in an orbital path. As the cutter progresses into the work the bottom of the hole being cut is of arcuate shape as indicated at 28 which has a radius R equal to the distance between the intersection point 26 between axes 22 and 24 and the outer periphery of the cutter at the lower end thereof. In the schematic showing of FIGS. 1 and 3 cutter 16 is illustrated as having a sidewall 30 provided with a plurality of teeth 32 around the lower edge thereof, the teeth 32 lying substantially in a single plane perpendicular to the axis 24 of the cutter.

For the purpose of this description angle $a$ shall be referred to as the eccentricity angle. Dimension $b$, measured in the plane of teeth 32 between the intersections of axes 24 and 22 with said plane of the teeth 32, will be referred to as the offset eccentricity. Offset eccentricity $b$ is proportional to the eccentricity angle $a$ and the distance between intersection point 26 and the point 34 where axis 24 intersects the plane of the teeth 32. If the device is constructed so that the plane of the cutting teeth can be shifted toward and away from the intersection point 26, offset eccentricity $b$ can be altered while maintaining a constant setting of eccentricity angle $a$. If, in addition, bushing 12 is mounted on shaft 10 so that the inclination of axis 24 relative to axis 22 is adjustable, the eccentricity angle $a$ can be varied while maintaining a desired offset eccentricity $b$.

As shown in FIG. 3, the radius $R_1$ of the hole being cut is equal to the sum of the offset eccentricity $b$ and the outside radius $R_2$ of cutter 16 projected into a plane perpendicular to axis 22. The center slug 36 in the workpiece has a radius $r$ which is equal to the inside radius $r_1$ of the cutter less the offset eccentricity $b$ projected into a plane perpendicular to axis 22. From the above it follows that if the device is constructed so that the distance between intersection points 26 and 34 is adjustable and so that the eccentricity angle $a$ is adjustable, the diameters of the hole 18 and slug 36 relative to the inner and outer diameters of cutter 16 can be accordingly varied.

It also follows that as long as eccentricity angle $a$ is greater than zero the diameter of slug 36 will be less than the inner diameter of cutter 16 and, when the cutter breaks through the bottom face 38 of workpiece 20, slug 36 will be ejected from within the cutter by gravity alone without the necessity of any external ejecting mechanism.

Likewise it follows that by reason of offset eccentricity $b$ the diameter of hole 18 being cut is always greater than the outside diameter of cutter 16. This provides a clearance $c$ between the sidewall 40 of the hole being cut and the outer periphery of sidewall 30 of the cutter which is available for the discharge of cutting chips therethrough. The minimum offset eccentricity employed is that eccentricity which will permit an acceptable clearance $c$ for a discharge of chips. This may vary depending upon the material which is being cut. In hard materials (such as steel and the like) the offset eccentricity $b$ may be as little as a few thousandths of an inch whereas in softer materials (such as rubber, asbestos, etc.) where the chips being cut are substantially larger offset eccentricity $b$ may be relatively large. The eccentricity angle $a$ and the offset eccentricity $b$ are shown exaggerated in FIG. 2 merely to illustrate the principle of this invention.

In order to analyze the basic character of the motion of the cutter 16 when driven with the device of this invention reference may be made to FIGS. 3 and 4. In each of these figures there is illustrated the path of travel of a single given tooth 32a through one cutting cycle. For the purpose of showing a typical tooth path, let us assume that shafts 10 and 14 are rotated at different speeds in a ratio of about 1 to 1.1, respectively, and that the eccentricity angle $a$ and offset eccentricity $b$ are as shown in FIG. 2. In FIG. 3 tooth 32a is shown at its highest point in its orbit. This may be referred to as the start of the orbit cycle. As both shafts are rotated in a clockwise direction, it will be seen (as illustrated in FIG. 4) that when shaft 10 has rotated through 90° tooth 32a will have advanced in a clockwise direction from point 0 to point $0_1$. This results from the fact that shaft 14 is turning at a slightly greater speed than shaft 10. Since tooth 32a is rotating slightly faster than shaft 10 it shifts radially inwardly a slight extent when it has reached point $0_1$ and, by reason of the angular eccentricity $a$, tooth 32a has also progressed slightly downwardly into the hole being formed. Upon continued rotation of shafts 10 and 14 tooth 32a will move in a precessing manner until, at the completion of 5 revolutions of shaft 10, tooth 32a will be located at the lowest point $0_2$ in its orbital path. At this point tooth 32a is diametrically opposite the highest point 0 in its orbital path. Thus, with the parameters previously stated, tooth 32a will have generated a spiroidal path as indicated in FIGS. 3 and 4 which simulates a tapered screw thread.

Continuation of this cutting cycle will show that after 5 more revolutions of shaft 10 tooth 32a will return to the starting point 0 in the reverse direction of the described spiroidal path illustrated in FIGS. 3 and 4. It will be appreciated that the remaining teeth 32 on the cutter follow cutting paths identical to those shown in FIGS. 3 and 4 and differ therefrom only with respect to their position in relation to tooth 32a.

The motion described above can be thought of as two separate motions superimposed one upon another. One motion consists of the rotation of cutter 16 about its longitudinal axis 24. The other motion results from revolution of the cutter axis around shaft 10 at the eccentricity angle $a$. Superimposing these motions one upon another results in the plane of the cutting teeth 32 continually and progressively changing its position and imparting a uniform circular wobble affect to the cutter 16. The difference in rotational speed between shafts 10 and 14, the eccentricity angle $a$ and the offset eccentricity $b$ will determine the rate of rise and fall of the cutting teeth 32 in relation to the workpiece as well as the rate of change of the spiroidal radius as seen in FIG. 4.

The interrelationship of the various motion parameters (namely, the speed ratio between shafts 10 and 14, the eccentricity angle $a$ and the offset eccentricity $b$) will vary in accordance with the cutting characteristics desired. For example, in the case of a steel workpiece angle $a$ is a preferably very small angle, ½° or less, offset eccentricity $b$ may be as small as twenty or thirty thousandths of an inch, and the speed ratio between shafts 10 and 14 may be about 1 to 1.1. In the case of a softer material (such as brass) the eccentricity angle $a$ may be in a neighborhood of 2° and the speed ratio between shafts 1 and 14 may be as high as 1 to 4. On very soft material (such as rubber, plastic, asphalt, or the like) the eccentricity angle $a$ may be as large as 10° and the speed ratio between shafts 10 and 14 may be as high as 1 to 20.

Experience has shown that a very substantial increase in the life of a hole cutter is realized when driven by a device of this invention. As pointed out above, when a hole cutter is driven in the conventional manner all of the teeth remain in contact with the workpiece until the hole cutting operation is completed. With the device of this invention fewer number of teeth are in cutting relation with the work at any one time and it is only those teeth that are located adjacent the low point of the orbit that are taking a full width cut. Note in FIG. 2 that tooth 32 at the bottom of the orbital path is engaged across its full width at the bottom face of hole 18 as at 42 and tooth 32 at the top of the orbital path is merely touching sidewall 40 at its lower outer corner as at 44. When shafts 10 and 14 are rotated in the same direction, as each tooth advances upwardly in its orbital path the width of the chip being cut becomes progressively less until the tooth advances to the high point in its orbit. Likewise, if the rate of axial feed of the cutter is less than the rate of rise and fall of the teeth and the two shafts are being rotated in the same direction, the teeth cut only when they are traveling in an upwardly arcuate path. They are not in cutting relation to the work as they travel from the high point in their orbit to adjacent the low point in their orbit. Thus, the teeth are not only subject to less heat buildup but also can be cooled more readily since they are in cutting relation to the work only half of the time.

It will be also noted that if the axial feed rate of the cutter is such that the teeth are not in cutting relation to the work as they reach the high point in their orbital path, the chip being cut is freed while the teeth are rising in an orbital path. Thus, the teeth have a tendency to expel the chips upwardly and outwardly of the hole being cut when they reach the top of their orbital path.

The fact that the full width of each tooth is engaged in cutting relation with the workpiece for only a short period of time (at the bottom of the orbital path) and after which only the outer edge portion of the tooth is in cutting relation with the work is desirable not only from the standpoint of the ability to cool the teeth properly but also from the standpoint of reducing the high unit loading on the teeth and producing a very fine finish on the sidewall of the hole being cut. The cutting tooth motion described enables the use of a lighter and lower power input to the device. It also allows less feed load because for any given feed load a high contact pressure exists between the fewer cutting edges and the workpiece.

Most metals are of the work hardening type, some more so than others. This device permits cutting those which are extremely sensitive to work hardening. The reasons for this capability lie in the fact that with the device of the present invention the unit loading at the cutting edges of the teeth is very high at the initiation of the cutting cycle (the low point in the orbit). As the cutting cycle progresses the chip becomes progressively smaller in width and height, thus offering decreasing resistance to the continued cutting action. The rising effect of the cutting tooth which results from the orbital motion of the cutter reduces the amount of cold flow in the metal of the workpiece immediately ahead of the cutting edge. This reduction in the cold flow of metal, the reduction of the frictional heat during cutting and the high unit loading of the teeth result in excellent cutting characteristics in work hardening types of metals.

When a hole cutter is driven with the device of this invention the tendency to produce an objectionable burr around the bottom edge of the hole is practically eliminated. As the cutter breaks through the bottom of the workpiece upon completion of a hole cutting operation the fact that a small cut is being made at the hole diameter is very effective in removing the burr which normally results when using a hole cutter driven in the conventional manner. This is true because a burr is caused by tensile failure of very thin section of material immediately below the cutting tooth as a result of the high feed load exerted. With the device of the present invention the feed load required is relatively low and, thus, a relatively low pressure is exerted on the material below the cutting edges. The very small chip cut from the workpiece at the sidewall 40 of the hole and the accompanying low forces exerted upon the metal prevent deflection of the burr and as a result the burr is virtually completely removed.

When a hole cutter is driven by this device the tendency for it to bind on and seize the work at the point of breakthrough is reduced to a minimum. As the cutter begins to break through the bottom of the workpiece the number of cutting teeth which are actually breaking through the material usually is limited to as few as one to three teeth and the total force acting at the thinnest section of the workpiece is therefore very small. Likewise, depending upon the speed ratios of shafts 10 and 14, the tooth or teeth which are breaking through are rising rapidly in the orbital path away from the breakthrough point. Furthermore, as pointed out above, the teeth which are not performing the initial breakthrough are removing material from the sidewall of the hole. These three factors virtually eliminate breakthrough binding and seizure because fewer teeth tend to bind, the low feed load at the work prevents acceleration of the feed rate at the point of breakthrough which normally results from workpiece and driving machine deflection or workpiece failure, and the remaining cutting teeth are still supported by the uncut workpiece material there by stabilizing the cutter.

The device of the present invention also enables the length of the workpiece chip to be controlled by adjustment of the device itself rather than by the conventional practice of grinding the cutting tooth to control chip length. With the present device chip length is obtained by varying the speed ratio of shaft 10 in relation to shaft 14. When both shafts are rotating at the same speed and in the same direction the chip length is theoretically infinite. As the difference of speeds between shafts 10 and 14 is increased the length of chip becomes proportionately shorter. When the two shafts are rotated in opposite directions the chip length becomes very short. Thus the device can be adjusted to accommodate cutting of a large variety of different materials with the same hole cutter.

By reason of the motion of the cutter produced by the device of this invention, excellent results can be obtained when cutting holes in such materials as wood, rubber, plastic, asphalt and other soft and/or low-melting-point materials. AS described above, the maximum depth and width of cut occur at the lowest point in the orbital path of the teeth. This is also the point where the lowest teeth are spaced inwardly from the sidewall of the hole the greatest extent. Depending upon the particular angular eccentricity setting, the number of teeth on the cutter and the diameter of the cutter, only a small number of cutting teeth will be engaged to a full depth cut at any one time. This factor coupled with the fact that there is very little friction between the sidewall of the cutter and the sidewall of the hole being cut reduces friction to a minimum and thus restricts heat buildup to a minimum amount. In addition, as the teeth rise in their orbital path, the chip being cut becomes progressively smaller and a clean, smooth surface is cut on the sidewall of the hole. The ability to cut clean holes in such soft materials is also enhanced by the fact that the chip length can be reduced by increasing the ratio between the speeds of shafts 10 and 14 and also by rotating shaft 10 in a direction opposite to the direction of rotation of shaft 14.

The motion imparted to the cutter by the device of this invention also enables the elimination of a pilot on the cutter for initiating the hole cutting operation. As the cutter is brought into initial contact with the work, the teeth which are on the low side of the orbit begin to cut first. The feed load is relatively light and these teeth are located radially inwardly from the finished sidewall of the hole by an amount proportional to the offset eccentricity. Thus, the lateral forces acting on the teeth are very small and, if any lateral movement of the cutting tooth should occur when the cutting action is initiated, it will have no substantial effect on the finished diameter of the hole. This is true because the finished hole diameter is not established until the cutter has been fed into the work a distance great enough to enable those teeth which are traveling through the high point of the orbit path to begin to remove material. By the time this occurs the cutting cycle has progressed to an extent wherein the forces are stabilized sufficiently to define the desired hole diameter. However, where extreme accuracy is important a pilot may be employed.

It will also be appreciated that, by reason of the path of travel of the teeth on the cutter driven with the device of this invention, overlapping holes can be readily cut. This is particularly true if the feed rate of the cutter is lower than the rate of change of the vertical height of the cutting teeth since, under these conditions, cutting occurs only when the teeth are rising. The particular motion imparted to the cutter teeth by this device also enables a hole cutter to be used as a milling cutter.

In FIGS. 5 through 9 there is illustrated one practical embodiment of the device according to the present invention. As shown in FIG. 5, the device includes a housing 50 in which a shaft 52 is journaled as by bearing 54. In the particular embodiment shown housing 50 is designed to form a portion of a housing assembly enclosing a motor (not shown) to which shaft 52 is coupled. For example, housing 50 can form the nose housing of a hand-held drill or the like. In such cases the torque on housing 50 will be transmitted directly to the motor housing. It will be appreciated, however, that housing 50 can be completely independent of the housing of the driving motor and the torque reaction of housing 50 can be absorbed by providing an external element on housing 50 adapted to contact some stationary part of the driving motor assembly.

A cylindrical housing 56 is secured to the lower end of housing 50 by any suitable means, such as screws 58 (FIG. 8). Within housing 56 there is journaled, as by a bearing 60, a nose housing 62 in the form of a bushing or sleeve having a stepped bore. The inner periphery of bore portion 64 of nose housing 62 is eccentrically located with respect to the axial center of bearing 60. This is illustrated in an exaggerated manner in FIG. 7. Within the bore portion 64 of nose housing 62 there is arranged an adjusting ring 66, the bore 68 of which is likewise eccentrically disposed relative to the central axis of bearing 60. Shaft 52 is surrounded by a bushing 70 which is driven by shaft 52 through a flexible coupling 72. By reason of coupling 72 (formed of rubber or the like) the central axis of bushing 70 is adapted to be inclined to the axis of shaft 52 as shown in FIG. 5. Bushing 70 is journaled in adjusting ring 66 by a spherical bearing 74 which accommodates the inclination of the bushing axis. With this arrangement it is apparent that as ring 66 is rotated within nose housing 62 the axis of bushing 70, designated 76 in FIG. 7, is shifted laterally relative to the axis of bearing 60. Thus bushing 70 pivots about the center point 78 of flexible coupling 72. Ring 66 is adapted to be retained in its adjusted position within nose housing 62 by one or more ball detents 82 which are locked in position by screws 84.

Bushing 70 is internally threaded as at 86 to receive an arbor 88. A hole cutter 90 is rigidly mounted on the lower end of arbor 88 by any suitable locking mechanism, such as cup 92, clamping ring 94 and locking screw 96.

With the above-described construction the eccentricity angle $a$ can be adjusted by rotating ring 66 relative to nose housing 62 and the offset eccentricity $b$ can be varied by adjusting arbor 88 axially inwardly or outwardly of bushing 70. Arbor 88 is adapted to be locked in its adjusted position by a locking screw 98. As shown in FIG. 9, indicia 100 may be provided around the lower end of nose housing 62 so that the rotative position of ring 66 can be established by a reference line 102.

In the embodiment illustrated in FIGS. 5 through 9 housing 56 encloses gearing for establishing a driving connection between power input shaft 52 and nose housing 62. This gearing includes a pinion 104 attached to a shifter plate assembly 106 that is keyed or splined to shaft 52 as at 108 for vertical shifting movement. In the lowered position of shifter plate assembly 106 pinion 104 meshes with pinions 110 fixed to stub shafts 112 journaled in housing 56. Each stub shaft 112 has also fixedly mounted thereon a pinion 114 which meshes with a pinion 116 keyed to the upper end portion of nose housing 62.

A ring 118 encircles the outer periphery of housing 50 and housing 56. Ring 118 has a plurality of circumferentially extending slots 120 therein through which screws 122 extend for controlling the rotative movement of ring 118 and for locking ring 118 in its adjusted position. Ring 118 is also provided with a plurality of angularly inclined slots 124 around the periphery thereof through which screws 126 project. The inner ends of screws 126 are threaded into plate assembly 106. Vertical slots 128 in housing 50 and housing 56 restrict the movement of screws 126 to a vertical direction. With this arrangement ring 118 is adapted to be rotated in opposite directions to shift plate assembly 106 vertically. In the lowered position of plate 106 pinion 104 meshes with pinion 110 and in the raised position of plate assembly 106 pinion 104 meshes with idler pinions 130. Idler pinions 130 in turn mesh with pinions 132 on stub shafts 112. Thus, when plate assembly 106 is in the lowered position, nose housing 62 is rotated in the same direction as shaft 52 and, when plate assembly 106 is shifted to the raised position, nose housing 62 is rotated in a direction opposite to shaft 52.

In the arrangement illustrated in FIGS. 5 through 9 shaft 52, which has a direct driving connection with cutter 90, corresponds in function to shaft 14 in FIG. 1, nose housing 62 corresponds in function to shaft 10 and adjusting ring 66 corresponds in function with bushing 12. Thus, when shaft 52 is rotated the motion imparted to cutter 90 is the same as the motion described in connection with cutter 16 illustrated in FIGS. 1 through 4.

In the event the hole cutting operation to be performed requires the use of coolants or cutting fluids, housing 50 is fashioned with a coolant inlet 134 which registers with radial passageways 136 in shaft 52. Passageways 136 extend inwardly to an axial passageway 138 formed in shaft 52 and extending down to the lower end thereof. Seals 140 are provided at the connection between inlet passageway 134 and shaft 52. Within the lower end of axial passageway 138 a pilot 142 is adapted to be retained by a setscrew 144. Pilot 142 is suitably grooved to permit the flow of coolant or cutting fluid to the teeth of the cutter. Pilot 142, being mounted on shaft 52 rather than on cutter 90, is at all times located accurately at the center of the hole being cut. This eliminates the need for absolute rigidity in both the driving device and the fixturing of the work.

In FIG. 10 a device very similar to that shown in FIGS. 5 through 9 is illustrated. The primary difference between these two embodiments resides in the fact that in the embodiment illustrated in FIG. 10 pinion 116 on nose housing 62 meshes with a pinion 146 journaled in housing 56 and driven independently of shaft 52 by a flexible cable 148. With the arrangement shown in FIG. 10, since shaft 52 and cable 148 can be independently driven, any desired speed ration between the rotary motion of the cutter and its revolving motion can be obtained.

It should be pointed out that best results are obtained when the device is held rigidly in relation to the work, that is, when the device is mounted on the spindle of a machine tool such as a drill press, milling machine, etc. When so mounted, as distinguished from use with a hand-held drill, the eccentricity, either angular or offset, can be varied in a programmed manner by cams or other means to cut tapered, elliptical or holes of other desired configuration.

I claim:

1. A device for driving a hole cutter of the type having a cylindrical wall provided with teeth at one end of said wall lying in a plane perpendicular to the central axis of the cutter comprising, a housing, means forming a sleeve journaled in said housing for rotation about a first axis, means for rotating said sleeve, a shaft journaled in said sleeve for rotation about an axis inclined to the axis of rotation of the sleeve at an acute angle, means for varying the angular inclination of said shaft relative to the axis of rotation of said sleeve, means for rotating said shaft including and angular flexible connection with said shaft, said shaft including a pair of connected members which are axially adjustable relative to one another for varying the effective length of said shaft, said shaft extending outwardly of said housing at one end thereof and means at said end of the shaft for mounting a hole cutter thereon.

2. A device as called for in claim 1 wherein one of said axially adjustable members includes said hole cutter mounting means.

3. The method of cutting a hole through a workpiece utilizing a hole cutter of the open-ended cup type having a cylindrical sidewall provided with teeth around the lower free edge thereof which lie in a plane perpendicular to the central axis of the cutter which comprises simultaneously rotating the cutter about its central axis, inclining the axis of the cutter at an acute angle to a second axis aligned coaxially with the axis of the hole to be cut, revolving the axis of the cutter around said second axis at a uniform speed and feeding the cutter into the work while maintaining the second axis axially aligned with the axis of the hole to be cut and the cutter axis inclined to the second axis at said acute angle, said axes being maintained inclined to each other such that they intersect at a point above the lower open end of the cutter with the first axis being inclined away from the second axis in a direction from said point of intersection and towards the open end of the cutter and with the second axis intersecting the plane of the teeth within the circle defined by the teeth.

4. The method called for in claim 3 wherein said angle of inclination is less than 10°.

5. The method called for in claim 4 wherein the ratio between the speed of rotation of the cutter and the speed of revolution of the cutter axis is greater than 1 to 1 but not more than about 20 to 1.

6. The method called for in claim 4 wherein the difference between the speed of rotation of the cutter and the speed of revolution of the cutter axis is less than the lesser of said two speeds.

7. A device for driving a hole cutter of the type having a cylindrical wall provided with teeth at one end of said wall lying in a plane perpendicular to the central axis of the cutter comprising, a housing, means forming a sleeve journaled in said housing for rotation about a first axis, means for rotating said sleeve, a shaft journaled in said sleeve for rotation about an axis inclined to the axis of rotation of the sleeve at an acute angle, means for rotating said shaft, said shaft extending outwardly of said housing at one end thereof, means at said end of the shaft for mounting a hole cutter thereon, said sleeve comprising a pair of telescopically engaged members which are relatively rotatable, one of said members being eccentrically disposed relative to the other, said shaft having its opposite end pivotally supported concentric with the axis of rotation of said sleeve, said eccentrically disposed member engaging said shaft at a portion thereof spaced axially form said pivotally supported end so that when the eccentric member is rotated relative to the other member of the sleeve said one end of the shaft is displaced radially relative to said pivotal support to thereby vary the inclination of said shaft relative to the axis of rotation of the sleeve.

8. A device for cutting holes with a cylindrical hole cutter of the open-ended cup type having a cylindrical wall with a plurality of cutting teeth around the lower free edge thereof lying in a plane perpendicular to the central axis of the cutter comprising, a first member, means for rotating said first member about a first axis, a second member journaled on the first member for rotation about a second axis inclined at an acute angle to the first axis, means for rotating the second member about the second axis, said second member having a free end, a hole cutter of the above-described type mounted on said end of the second member for rotation coaxially therewith, the first and second axes intersecting at a point above the lower open end of the cutter, said second axis being inclined away from the first axis in a direction from said point of intersection towards the open end of the cutter, said first axis intersecting the plane of said cutting teeth within the circle defined by the cutting teeth, whereby, when said members are rotated about their respective axes and the device is fed into a workpiece along said first axis, the teeth cut an annular groove in the workpiece which has a cylindrical sidewall and an arcuate bottom wall, said bottom wall having a radius corresponding to the radial distance between the point of intersection of said first and second axes and the crests of said teeth and the radius of the groove sidewall corresponding to the base of a right triangle whose hypotenuse corresponds to the radius of the cutter plus the radial distance in the plane of the teeth between the axis of the cutter and the intersection of said first axis with the plane of the teeth.

9. A device as called for in claim 8 including means for varying the inclination of said second axis relative to the first axis.

10. A device as called for in claim 8 wherein said rotating means are adapted to rotate the shaft and sleeve at different speeds.

11. A device as called for in claim 8 including a cutter pilot member mounted on said first member concentric with said first axis, said pilot extending through said cutter and projecting outwardly below the plane of the teeth thereof.

12. A device as called for in claim 8 wherein said acute angle is not greater than about 10°.

13. A device as called for in claim 8 wherein said acute angle is not greater than about 2°.

14. A device as called for in claim 8 wherein the radial distance in the plane of said cutter teeth between the axis of the cutter and the axis of the first member is not more than about 0.040 inches.

15. A device as called for in claim 8 wherein the means for rotating said first and second members are interconnected such that the speed ratio thereof is greater than 1 to 1 but not greater than 1 to 20.

16. A device as called for in claim 8 wherein the means for rotating the first and second members are interconnected such that the speed ratio thereof is greater than 1 to 1 but not greater than 1 to 4.

17. A device as called for in claim 8 wherein the means for rotating the first and second members are interconnected such that the speed ratio thereof is greater than 1 to 1 but not greater than 1 to 2.

18. A device as called for in claim 8 including a housing, said first member comprising a sleeve journaled in the housing and the second member comprising a shaft journaled on said sleeve, said shaft having one end extending outwardly of said housing and means at said end of the shaft for mounting the hole cutter thereon.

19. A device as called for in claim 18 wherein said sleeve and shaft have telescopically related portions spaced axially from the intersection of said two axes, means connecting said sleeve and shaft for enabling said shaft to pivot relative to said sleeve about said last-mentioned point of intersection and an eccentric member extending circumferentially between and interengaging said telescopically related portions of said shaft and sleeve for pivoting the shaft about said last-mentioned point of intersection in response to rotation of the eccentric member.

20. A device as called for in claim 18 wherein said means for mounting the hole cutter on the end of the shaft has an axially extending bore therein, said shaft extending through said bore, and a cutter pilot member mounted on the portion of the shaft extending through said bore concentric with the axis of the shaft, said pilot member extending axially below the plane of the teeth on the cutter.

21. A device as called for in claim 18 wherein said means for mounting the hole cutter on the end of said shaft are adjustable axially of the shaft to vary the radial distance between the axis of the cutter and the axis of the sleeve in the plane of the cutter teeth.